United States Patent [19]
Schmidt et al.

[11] Patent Number: 5,609,134
[45] Date of Patent: Mar. 11, 1997

[54] OPERATING MECHANISM FOR AN ENGINE BRAKE VALVE OF AN INTERNAL COMBUSTION ENGINE

[75] Inventors: Erwin Schmidt, Baltmannsweiler; Eberhard Schneider, Waiblingen; Siegfried Lamsbach, Stuttgart, all of Germany

[73] Assignee: Mercedes-Benz AG, Stuttgart, Germany

[21] Appl. No.: 498,332

[22] Filed: Jul. 5, 1995

[30] Foreign Application Priority Data

Jul. 6, 1994 [DE] Germany ............... 42 23 657.3

[51] Int. Cl.⁶ .......................... F01L 13/06; F02D 13/04
[52] U.S. Cl. ............................. 123/322; 123/324
[58] Field of Search ........................ 123/321, 322, 123/324, 325

[56] References Cited

U.S. PATENT DOCUMENTS

| | | | |
|---|---|---|---|
| 3,547,087 | 8/1968 | Siegler | 123/321 |
| 3,548,793 | 12/1970 | Richardson | 123/90.12 |
| 4,158,348 | 6/1979 | Mason et al. | 123/321 |
| 5,000,146 | 3/1991 | Szucanyi | 123/321 |

FOREIGN PATENT DOCUMENTS

| | | | |
|---|---|---|---|
| 907841 | 3/1954 | Germany. | |
| 3736595 | 5/1989 | Germany. | |
| 3904497 | 1/1990 | Germany. | |
| 4301835 | 12/1993 | Germany. | |
| 4315473 | 11/1994 | Germany. | |
| 46-39894 | 11/1971 | Japan | 123/325 |
| 197945 | 5/1938 | Switzerland. | |
| 2194587 | 3/1989 | United Kingdom. | |

OTHER PUBLICATIONS

Die Motorbremse von Nutzfahrzeugen—Grenzen und and Möglichkeiten zur Weiterentwicklung; ATZ, 1988, No. 12 pp. 671–675.

*Primary Examiner*—Andrew M. Dolinar
*Attorney, Agent, or Firm*—Klaus J. Bach

[57] ABSTRACT

In an operating mechanism for an engine brake valve of an internal combustion engine which has fuel injectors mounted in the cylinder head to which pressurized fuel is delivered through high pressure fuel passages from a high pressure fuel injection pump, a hydraulic operating piston disposed in a hydraulic cylinder is operatively connected to the engine brake valve by way of a lever which is actuated by the hydraulic operating piston when fuel under pressure is supplied to the hydraulic cylinder and a hydraulic control valve is arranged in the high pressure fuel passages for selectively directing the high pressure fuel from the injection pump either to the injector for injection into the engine or to the hydraulic cylinder for opening the engine brake valve at the end of an engine compression stroke to discharge the compressed gas from the engine during engine braking operation.

8 Claims, 4 Drawing Sheets

5,609,134

OPERATING MECHANISM FOR AN ENGINE BRAKE VALVE OF AN INTERNAL COMBUSTION ENGINE

BACKGROUND OF THE INVENTION

The invention relates to an operating mechanism for an engine brake valve of an internal combustion engine wherein the operating mechanism is disposed on the engine cylinder head and adapted to control the operation of the brake valves and of the fuel injection system.

An operating mechanism for an engine brake valve is known for example, from DE 43 01 835 C1. This patent discloses an internal combustion engine with an operating mechanism disposed in the cylinder head by which an engine brake valve which is spatially distinct from the engine exhaust valve is operable in order to provide, in the area of the top dead center, for decompression of the air compressed during the compression stroke. The operating mechanism comprises a hydraulic cylinder with a hydraulic piston including actuating means connected to an injection pump. The injector has an injector support and an intermediate injection line is provided with a flow control device such that flow communication from the injection pump to the injector can be interrupted and re-established and the engine brake valve can be operated accordingly.

For further general background information, reference is made to patent publication DE 39 04 497 C1 and the publication "Die Motorbremse von Nutzfahrzeugen—Grenzen und Möglichkeiten zur Weiterentwicklung" ATZ, 1988 No. 12, pages 671–675. (The Engine Brake of Commercial Vehicles—Limits and Possibilities for Further Development).

It is the object of the present invention to provide an operating mechanism for an engine brake valve which can be utilized in a highly variable manner and which provides for high operational reliability.

SUMMARY OF THE INVENTION

In an operating mechanism for an engine brake valve of an internal combustion engine which has fuel injectors mounted in the cylinder head to which pressurized fuel is delivered through high pressure fuel passages from a high pressure fuel injection pump, a hydraulic operating piston disposed in a hydraulic cylinder is operatively connected to the engine brake valve by way of a lever which is actuated by the hydraulic operating piston when fuel under pressure is supplied to the hydraulic cylinder and a hydraulic control valve is arranged in the high pressure fuel passages for selectively directing the high pressure fuel from the injection pump either to the injector for injection into the engine or to the hydraulic cylinder for opening the engine braking valve at the end of an engine compression stroke to discharge the compressed gas from the engine during engine braking operation.

It is a particular advantage of the arrangement according to the invention that the operating mechanism as such can be utilized for various engine applications as it requires only a change of shape, size or position of the valve operating lever to adapt the hydraulic operating mechanism for various engine brake arrangements, for example, for use with two outlet valves per cylinder or different outlet valve arrangements, for example, valves located at different angular positions.

If the internal combustion engine uses for example two outlet valves per cylinder, one of the outlet valves may serve, at the same time, as engine brake valve (decompression valve) whereby the need for a separate engine brake valve is omitted.

Since, in accordance with the invention, the engine brake valve is operated by way of a lever the lever arm lengths can be so selected that the arm thereof adjacent the hydraulic operating piston is longer than the arm engaging the engine brake valve thereby providing for a lever ratio which facilitates opening of the brake valve. Then, the pressure generated by the injection pump is sufficient to reliably open the brake valve for engine braking operation. With the use of such an operating lever, operation of the engine brake valve is possible in a simple manner by selection of the lever ratio, even for the highest engine compression pressures. Since, with the arrangement according to the invention, the hydraulic operating pressure for the valve operating mechanism never exceeds the injection pressure sealing of the injector mount and of the hydraulic cylinder is relatively simple.

In a preferred arrangement according to the invention, the valve operating control arrangement includes an electromagnetically or pneumatically operable valve for controlling the injection fuel flow from the injection pump to either an injector or a valve operating mechanism However, the invention will be described below in greater detail on the basis of the enclosed drawings.

DESCRIPTION OF THE PREFERRED EMBODIMENTS

Figure 1:
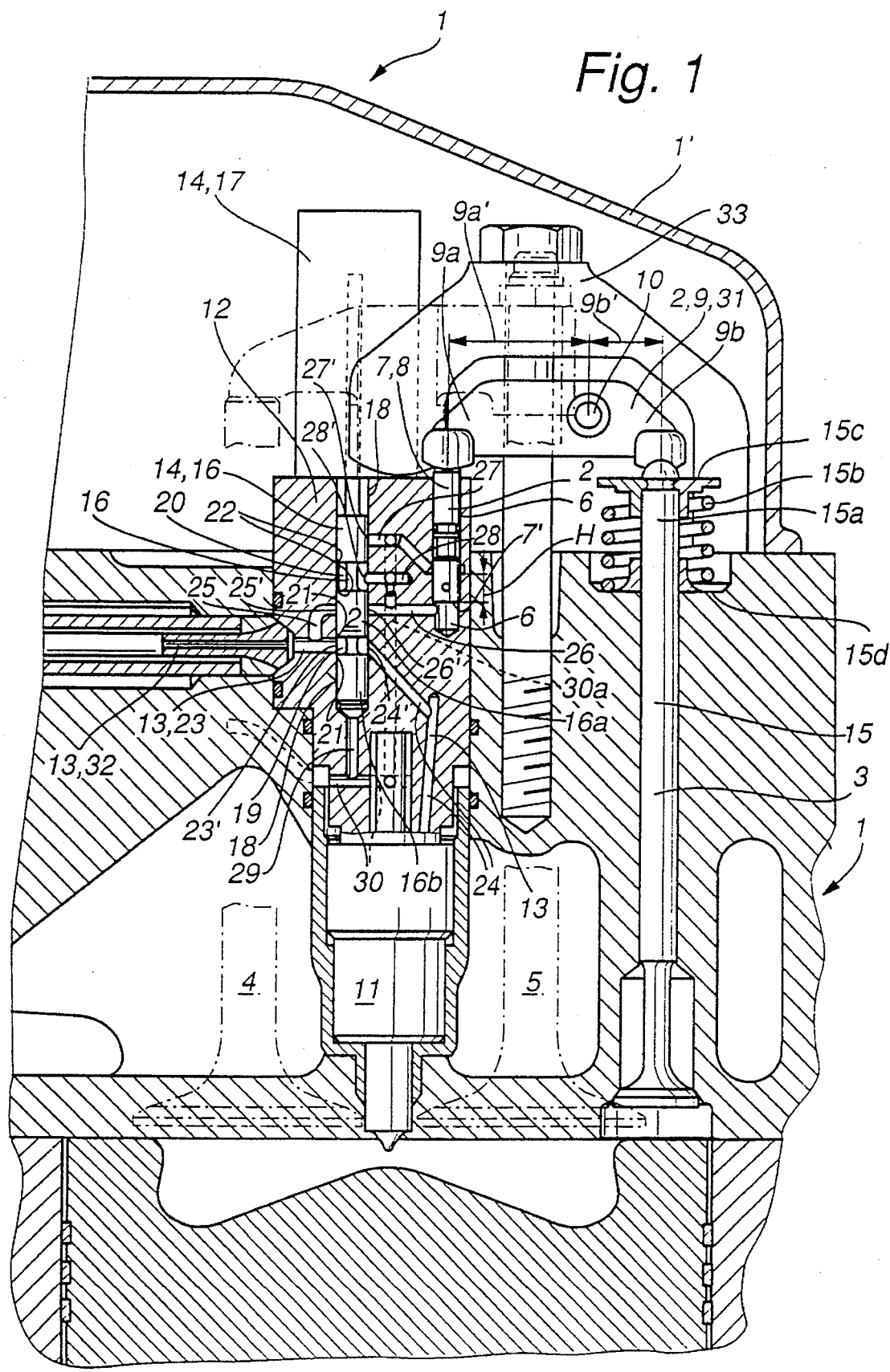
FIG. 1 is a cross-sectional view of a cylinder head of an internal combustion engine with an operating mechanism for an engine braking valve shown in a closed position for normal engine operation.
Figure 2:
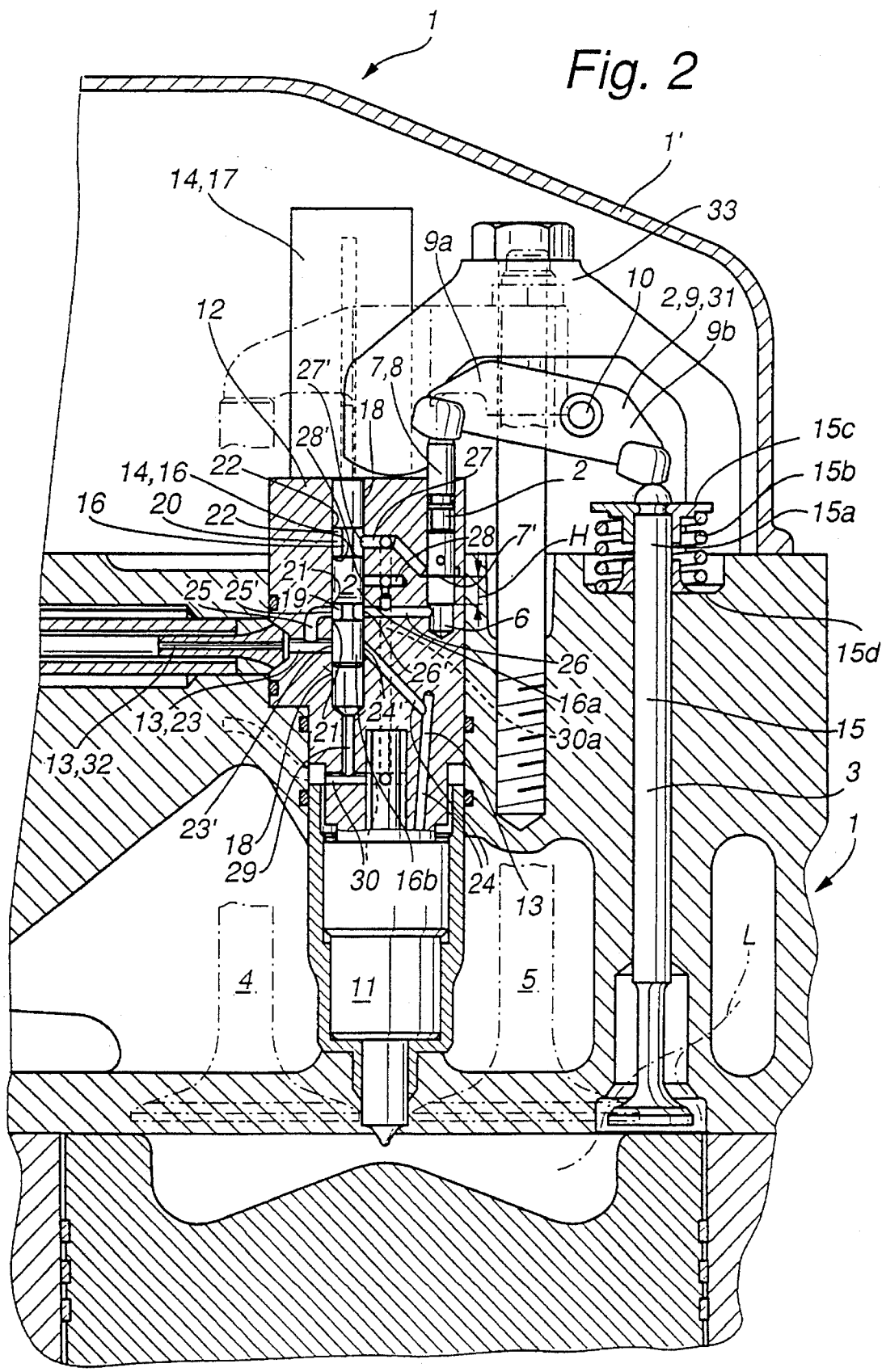
FIG. 2 is a cross-sectional view like FIG. 1, with the engine brake valve in an open position for engine braking operation.

FIGS. 1 and 2 are cross-sectional views of a first embodiment of the invention showing a cylinder head 1 with a cylinder head cover 1' of a multicylinder internal combustion engine which is not shown in greater detail.

The operating mechanism 2 for an engine brake 3 is shown in FIG. 1 for a position of the valve 3 in which it is closed for normal engine operation and in FIG. 2 for engine braking operation of the internal combustion engine.

For controlling the gas changing process, the cylinder head 1 includes for each cylinder two inlet valves 4 and two outlet valves 5 but in FIG. 1 only one inlet valve 4 and one outlet valve 5 are indicated by dash-dotted lines. The inlet and outlet valves are operated by a cam shaft via rocker arms which are known in principle and are therefore not shown in the drawing. The operating mechanism 2 disposed in the cylinder head 1 comprises a hydraulic cylinder 6 with a hydraulic piston 7 with piston rod 8 and a lever 9 which is pivotally supported by a pivot bearing 10. The operating mechanism 2 is also connected to the injection line 13 extending between an injection pump which is not shown in the drawings and an injector 11 with an injector mount 12 and a control valve 14 arranged in the injection line 13.

The injector 11 and the injector mount 12 which extends almost to the cylinder head cover 1 are commonly received in a cavity in the cylinder head 1. The injector 11 and the injector mount 12 are plug-in units which are held in the cavity by a clamping claw 33 which is bolted onto the cylinder head 1.

The engine brake valve 3 which is spatially separated from the outlet valve 5 can be operated by the lever 9. The lever 9 is actuated by the hydraulic piston 7 and the piston rod 8 for decompression of the compressed gas at the end of the engine piston compression stroke when the piston is in the area of the top dead center position. The piston rod 8 also serves as a seal structure by having seal sections which engage the wall of the hydraulic cylinder 6 for sealing the cylinder space to prevent leakage of the highly pressurized fuel contained in the hydraulic cylinder 6. The piston rod seal structure has a clearance which depends on the fuel pressure and which is about 2 to 6 micrometers.

The engine braking valve 3 comprises a valve shaft 15 with a valve shaft end 15a, a valve spring 15b and a spring seat 15c mounted on the valve shaft end 15a. The valve spring 15b is disposed, with one end thereof, in a valve spring cavity 15d formed into the cylinderhead 1 and engages, with its other end, the spring seat 15c so as to bias the engine brake valve 3 into a closed position. At the same time, the valve spring 15b biases the hydraulic piston 7, via the lever 9, into the normal engine operating position as shown in FIG. 1.

The lever 9 which is a rocker lever 31 pivotally supported on the cylinder head 1 has, adjacent the hydraulic piston, a lever arm section 9a which is longer than the lever arm section 9b. The lever arm section 9a has a length 9a' and the lever arm section 9b has a length 9b' wherein the lengths 9a' and 9b' are the lengths as measured from the pivot bearing 10 to the respective contact points of the lever arm sections that is, of the rocker 31, with the hydraulic piston 7 and the valve shaft 15.

In the example as presented in the drawings, the lever ratio 9a': 9b' of the lever arm sections 9a and 9b is 2:1. Consequently, the forces applied to the hydraulic piston 7 by the predetermined fuel injection pressure is doubled when applied via the rocker arm 31 to the engine brake valve 3.

The control valve 14 which controls the fuel flow comprises a valve spool 16 with an electromagnetic operator 17. The valve spool 16 which is disposed in a cylindrical guide passage 18 includes two circumferential grooves which, together with the cylindrical passage 18, define annular control channels 19 and 20 with control edges 21 and 22. With the annular control channels 19 and 20 of the valve spool 16, flow communication can be established or interrupted between the injection pump and the injector or, respectively, between the injection pump and the hydraulic cylinder for operating the engine brake valve in a manner as described in detail below:

The injector mount 12 includes fuel passages 23–30 wherein the fuel passages 23–28 each have end openings 23'–28' joining the cylindrical guide passage 18. The fuel passages 29, 30 are fuel return passages for returning fuel to the fuel tank. The fuel passage 25 branches off the fuel passage 23 and is, consequently, in flow communication therewith. A return channel 30a, which is shown in dashed lines; provides for communication between the fuel passages 27 and 28 and the fuel return passage 30.

Below follows a description of the functions of the control valve in accordance with the invention.

During normal operation of the engine, the valve operator 17 keeps the spool 16 in a position as shown in FIG. 1 so that the annular control channel 19 of the spool 16 provides for communication between the fuel passages 23 and 24 and the fuel from the high pressure fuel system including can flow to the injector 11. At the same time, a portion 16a of the spool 16 blocks the passage opening 25' of the fuel passage 25 so that communication between the passage 25 and the hydraulic cylinder 6 is interrupted and the hydraulic piston 7 is not subjected to the fuel pressure. The fuel return via return passage 30 is blocked during normal operation of the engine but fuel flow through fuel passage 28 to the return passage 30 is possible.

For engine braking operation the valve operator 17 moves the spool 16 to the position as shown—FIG. 2, such that the annular control channel 19 of the spool 16 provides for communication between the fuel channels 25 and 26 Then, fuel supplied from the high pressure line 32 and through the fuel channel 23 can flow into the hydraulic cylinder 6 for subjecting the hydraulic piston 7 to the high pressure fuel. At the same time, the spool cylinder section 16b of the spool 16 blocks the passage opening 25' of the fuel passage 25 so that communication of the passage 25 with the injector 11 is blocked and no fuel is ejected from the injector 11. During operation of the engine brake valve 3, that is, upon opening of the brake valve 3, highly compressed air L is conducted to the engine exhaust as indicated in FIG. 2 by a dash-dotted line. During engine braking operation, the fuel return via return passage 30a is possible as communication between fuel passage 27 and return passage 30 is open and communication between fuel passage 28 and return passage 30 is blocked.

For limiting travel of the hydraulic piston 7, the fuel passage 27 opens into the hydraulic cylinder 6 at such a point that, if the travel of the hydraulic piston 7 is greater than the maximum predetermined travel H, the fuel is discharged into the fuel return passage 27 as the fuel return passage is opened by a control edge 7' formed on the piston 7.

Figure 3:
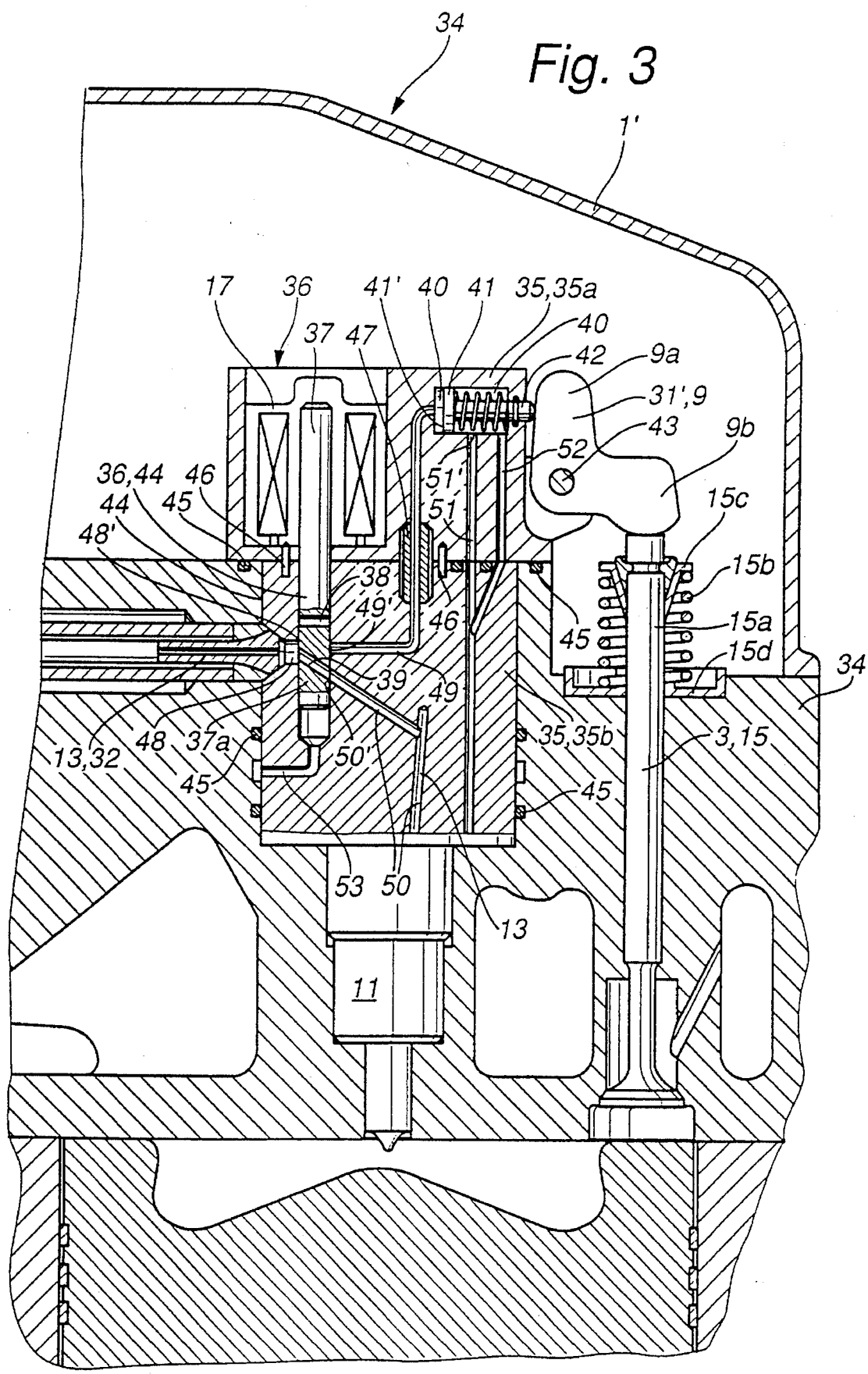
FIG. 3 shows, in a cross-sectional view, like the one given in FIG. 1, a second embodiment wherein the engine brake valve is operable by an elbow lever and controlled by an electromagnetically operable spool valve.

FIG. 3 shows a second embodiment of the invention. It is a partial cross-sectional view of a cylinder head 34 wherein operating mechanism 2 includes as the lever 9 an angled lever 31', a two part injector mount 35 and an electromagnetic magnetic operator 17 for the two-way fuel valve 36. The two-way fuel valve 36 includes a spool 37 with control channels 38 and 39. For identical components, FIG. 3 uses the same reference numerals as FIG. 1.

For the gas change control, the cylinderhead 34 includes one inlet and one outlet valve which are not shown in FIG. 3. The operating mechanism mounted on the cylinderhead 34 comprises a hydraulic cylinder 40, a hydraulic piston 41 with piston rod 42 and the lever 9 which, in this case, is an angled lever 31'. The angled lever 31' is pivotally mounted on the injector mount 35 by a pivot bearing 43. The two-way fuel valve 36 is disposed in the injector mount in the path of the injection line 13 extending from the injection pump, which is not shown, to the injector 11 supported in the injector mount 35.

The injector 11, together with the injector mount 35, which comprises injector mount parts 35a and 35b, is received in a cavity formed in the cylinderhead 1, wherein the injector 11 and the injector mount 35 form a plug-in unit which is held in the cylinderhead 1 by a clamping arrangement like the one described in connection with FIG. 1 (but not shown in FIG. 3). The engine brake valve 3 operable for decompression at the end of the compression stroke near the top dead center position of the engine piston can be controlled by the hydraulic piston 41 and its piston rod 42 by way of the lever 9. Upon actuation of the engine brake valve 3, the highly compressed air is discharged from the engine cylinder into the engine exhaust (as shown in FIG. 2.

As explained in connection with FIG. 1, the decompression valve spring 15b is supported with one end in a spring receiving cavity 15d in the cylinderhead 34 while its other end engages a spring seat 15c mounted on the valve shaft 15 of the engine brake valve 3, so as to bias the valve 3 into its closed position. At the same time, the valve spring 15b presses the piston rod 42 of the hydraulic piston, by way of the lever 9 (angled lever 31') into the normal engine operating position as shown in FIG. 3.

The lever arm section 9a of the lever 9 adjacent the hydraulic piston 41 is, in the example shown in FIG. 3, about as long as the lever arm section 9b adjacent the engine brake valve 3. But as pointed out above the arm section 9a may be substantially longer than the arm section 9b.

The two-3way control valve 36 which controls the fuel flow from the injection pump comprises the spool 37 which is connected to the electromagnetic valve operator 17. The spool 37 which is supported in a guide bore 44 includes the control channel 38 extending essentially parallel with the injection line 13 and the control channel 39 which extends at an angle thereto. With the control channels 38 and 39 of the spool 37, the flow communication from the injection pump to the injector 11 or from the injection pump to the hydraulic cylinder operating the engine braking valve 3 can be established or interrupted in a manner as described below in greater detail.

The two parts 35a and 35b of the injector mount 35 are sealed by means of seals 45 and are centered by means of centering pins 46. In the area of the sealing joint of the two parts 35a and 35b, the fuel passage 49 is provided with a pressure seal sleeve 47.

The injector mount 35 includes fuel passages 48–53 wherein the passages 48–50 have open ends 48'–50' leading to the guide bore 44. The fuel passage 51 serves to limit the travel of the hydraulic piston 41 and has an open end 51' joining the hydraulic cylinder 40. The fuel passages 52 and 53 are fuel return or discharge passages for returning fuel back to the fuel tank (like fuel channel 51). The two-way fuel valve 36 operates like the valve 14 described in connection with FIG. 1. For normal operation of the engine, the valve operator 17 positions the valve spool 37 as shown in FIG. 3 whereby flow communication is provided, through the spool passage 39 and passages 48 and 50, between the fuel high pressure line 32 and the injector 11 for supplying fuel thereto. At the same time, a portion 37a of the spool 37 blocks the outlet opening 49' of the fuel passage 49 so that communication of the passage 49 with hydraulic cylinder 40 is interrupted and the hydraulic piston 41 is not operable by the pressurized fuel.

During motor braking operation (corresponding to the FIG. 2 arrangement), the valve operator 17 positions the spool 37 in such a way that the control channel 38 of the spool 37 provides for a communication path between the fuel passages 48 and 49 so that pressurized fuel can flow from the high pressure line 32 and the fuel passage 48 to the hydraulic cylinder 40 whereby the hydraulic piston 41 is subjected to high pressure fuel for operation of the decompression valve 3. At the same time, a section 37a of the spool 37 blocks the open end 50' of the fuel passage 50 so that flow communication with the injector 11 is interrupted and no fuel is supplied to the injector 11.

In order to limit movement of the hydraulic piston 41, the fuel return passage 51 joins the hydraulic cylinder 40 at such a point that, for a hydraulic piston movement of more than the predetermined maximum travel of the piston 41, the fuel return passage 51 is opened by a control edge 41' of the hydraulic piston permitting the fuel to be discharged from the hydraulic cylinder 40 into the fuel return passage 51.

Figure 4:
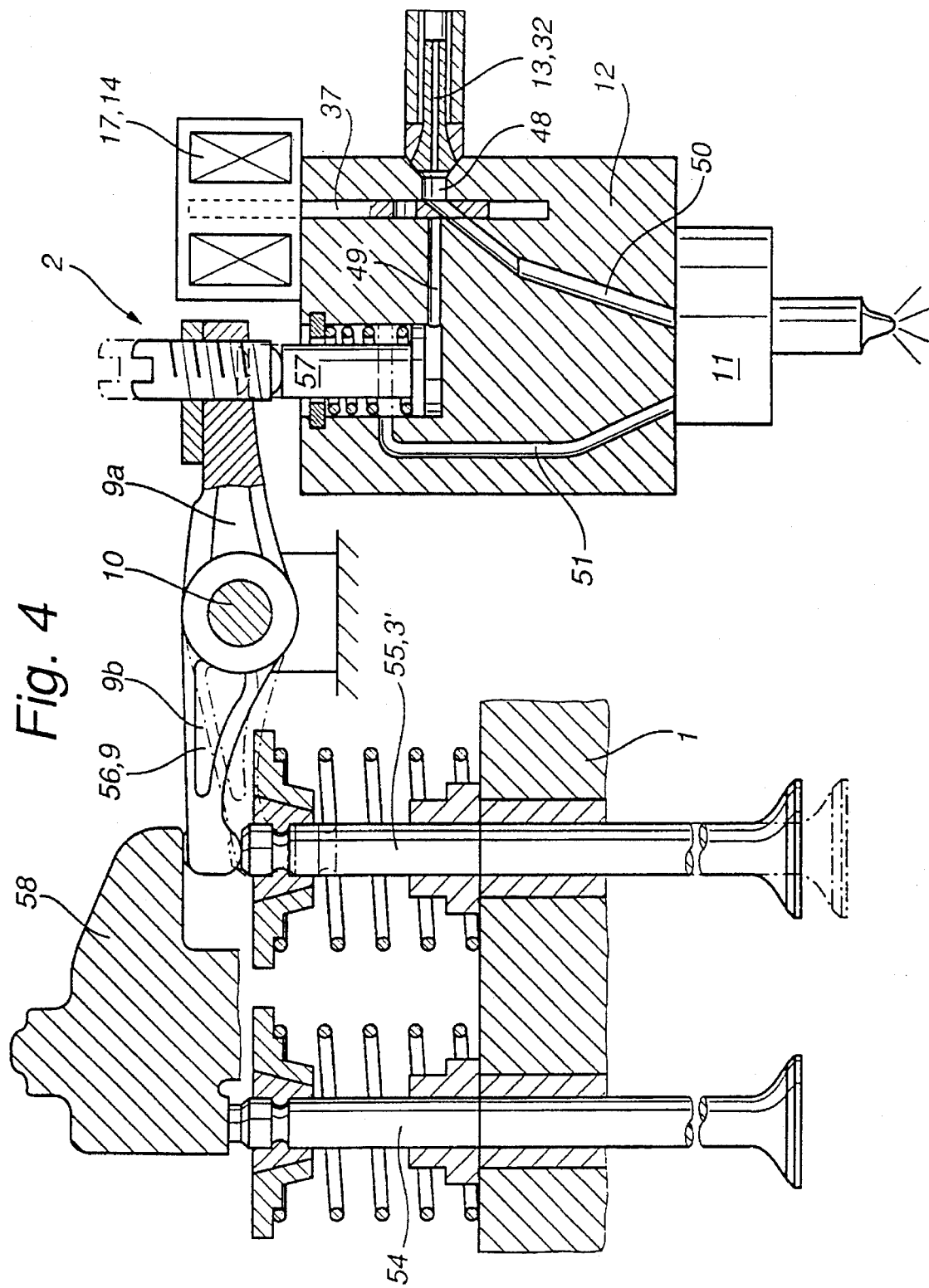
FIG. 4 is a cross-sectional view of the valve operating mechanism for an internal combustion engine with two exhaust valves per cylinder wherein one of the two valves which are interconnected by a valve bridge structure is used, at the same time, as a motor brake valve by providing a double arm lever which extends between the respective exhaust valve and the hydraulic operating piston of the engine brake actuating mechanism.

FIG. 4 shows a third embodiment in a cross-sectional view of a partial structure similar to that shown in FIG. 1. In this case, the internal combustion engine has two outlet valves 54 and 55 for each cylinder wherein the outlet valve 55 serves, at the same time, as an engine brake valve 3' and wherein the lever 9 formed as a rocker arm 56 is arranged between a hydraulic piston 57 and the outlet valve 55. Functionally identical components of FIGS. 3 and 4 are indicated by the same reference numerals. The outlet valves 54 and 55 are joined by a valve bridge 58 which is operated by a cam shaft not shown in the drawing. The operation of the arrangement according to FIG. 4 is, in principle, the same as that explained in connection with FIGS. 1 to 3 except that, in the arrangement of FIG. 4, the outlet valve 55 is used also as a decompression valve for engine braking operation. The position of the operating mechanism for normal engine operation is shown in full lines whereas its position for engine braking operation is shown in dash-dotted lines.

In another embodiment, the engine brake valve may be a constant throttle valve. Furthermore, in place of an electromagnetic valve operator, it is, of course, possible to use a hydraulic or a pneumatic valve operator. If the operating lever for the decompression valve has opposite arms of about the same length as shown for example for the angled lever of FIG. 3, the operating force needed for the decompression valve can also be obtained by increasing the diameter of the hydraulic cylinder and the hydraulic piston operating the decompression valve.

What is claimed is:

1. An operating mechanism for an engine brake valve of an internal combustion engine having a cylinderhead with at least one set of gas inlet and outlet valves, a fuel injector mounted in an injector mount removably received in a cavity formed ID said cylinder head and a high pressure fuel passage extending through said cylinderhead to said injector for delivering pressurized fuel from a high pressure fuel pump to said injector for injection into said engine, said engine brake valve being operable at the end of an engine compression stroke for discharging compressed gas and thereby destroying energy, said operating mechanism comprising a hydraulic piston disposed in a hydraulic cylinder formed in said injector mount, a pivotally supported operating lever having first and second arms, one engaging said engine brake valve and the other being engaged by said hydraulic piston for operating said engine brake valve, said injector mount further including a hydraulic control valve disposed in the path of said high pressure fuel passage for directing the high pressure fuel from said high pressure fuel passage selectively to said injector or said hydraulic cylinder for operating said brake valve and means for operating said hydraulic control valve to direct said high pressure fuel to said hydraulic piston for timed opening of said brake valve whenever engine braking operation is desired.

2. An operating mechanism according to claim 1, wherein the first arm of said operating lever disposed adjacent said hydraulic piston is longer than the second arm of said operating lever disposed adjacent said engine brake valve.

3. An operating mechanism according to claim 1, wherein said operating lever is a rocker arm pivotally mounted on the cylinderhead and engaging with its opposite ends said engine brake valve and said hydraulic piston, respectively.

4. An operating mechanism according to claim 1, wherein said internal combustion engine gas two outlet valves for each cylinder and one of said two outlet valves also serves as an engine brake valve, said brake valve operating lever engaging said one outlet valve.

5. An operating mechanism according to claim 1, wherein said hydraulic control valve is a spool valve including fuel flow control channels adapted to direct said high pressure fuel either to said injector while interrupting fuel flow to said hydraulic cylinder or to said hydraulic cylinder while interrupting fuel flow to said injector depending on the position of said spool valve, and said means for operating said hydraulic control valve comprises one of an electromagnetic and pneumatic valve operator.

6. An operating mechanism according to claim 1, wherein a fuel discharge passage extends from said hydraulic cylinder at a predetermined location such that travel of said hydraulic piston is limited when said fuel discharge passage is opened by said hydraulic piston to a predetermined maximum travel distance, said predetermined location of said discharge passage being so selected that the travel of said hydraulic piston is limited by a control edge of said piston which opens said discharge passage.

7. An operating mechanism according to claim 1, wherein said rocker lever is angled and pivotally mounted on a side of said injector mount with two arms projecting therefrom one arm engaging said engine braking valve and the other arm extending along-side said injector mount and being engaged by said hydraulic piston which is disposed in a hydraulic cylinder formed in said injector mount.

8. An operating mechanism according to claim 1, wherein said operating lever is a rocker arm pivotally supported on said injector mount and engaging with its opposite ends said engine brake valve and said hydraulic piston, respectively.

* * * * *